Oct. 14, 1924.                                                      1,511,304
                          G. B. SCHROYER
                              CASE
                        Filed Aug. 16, 1922        2 Sheets-Sheet 1

G. B. Schroyer
INVENTOR
BY Victor J. Evans
ATTORNEY

WITNESS:

Oct. 14, 1924.  
G. B. SCHROYER  
CASE  
Filed Aug. 16, 1922  
1,511,304  
2 Sheets-Sheet 2
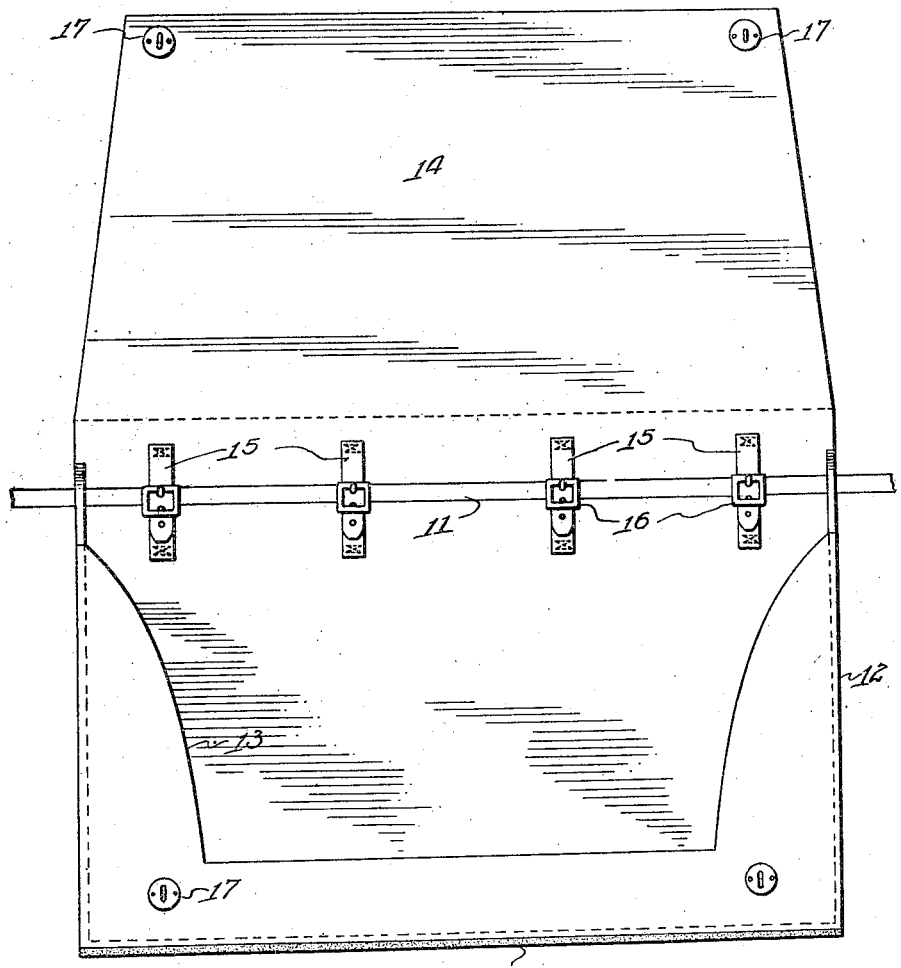
Fig. 3.
Fig. 4.
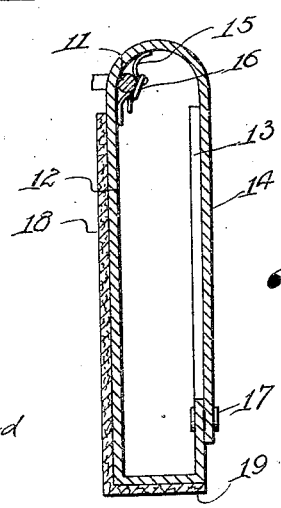
WITNESS:
G.B. Schroyer
INVENTOR
BY Victor J. Evans
ATTORNEY Patented Oct. 14, 1924.

1,511,304

UNITED STATES PATENT OFFICE.

GEORGE B. SCHROYER, OF WILMINGTON, DELAWARE.

CASE.

Application filed August 16, 1922. Serial No. 582,208.

*To all whom it may concern:*

Be it known that I, GEORGE B. SCHROYER, a citizen of the United States, residing at Wilmington, in the county of New Castle and State of Delaware, have invented new and useful Improvements in Cases, of which the following is a specification.

This invention relates to improvements in receptacles and has for an object the provision of a receptacle or case of novel construction, designed for use in automobiles for conveniently carrying robes, wearing apparel or similar articles so as to afford protection from dust or rain.

Another object of the invention is the provision of a receptacle for this purpose, which may be removably secured in position in a manner to prevent removal by unauthorized persons and thereby protect the contents of the receptacle against loss by theft.

With the above and other objects in view, the invention further includes the following novel features and details of construction, to be hereinafter more fully described, illustrated in the accompanying drawings and pointed out in the appended claim.

In the drawings:

Figure 3 is an enlarged view similar to Figure 1 with the case or receptacle open.

Figure 4 is an enlarged section on the line 4—4 of Figure 1.

Figure 1:
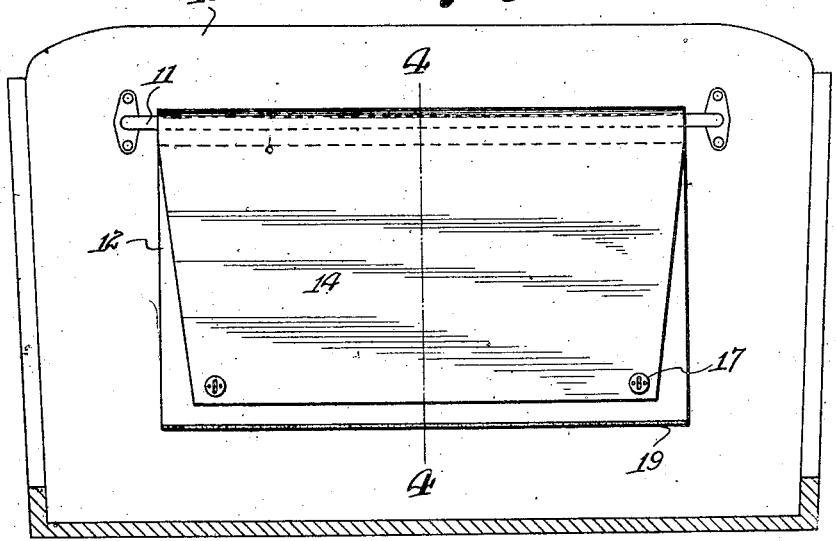
Figure 1 is an elevation showing the rear portion of the front seat of an automobile and the robe rail carried thereby, with the invention in position for use.
Figure 2:
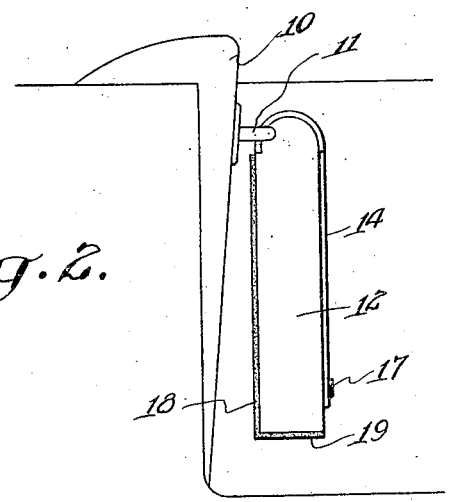
Figure 2 is a side view of the same.

Referring in detail to the drawings, wherein like characters of reference denote corresponding parts, the reference character 10 indicates a support, such as the front seat of an automobile, while 11 indicates a rod, for example the robe rod of an automobile which is permanently attached to the back of the front seat 10.

While the invention is shown as applied to the robe rod 11, it is obvious that it may be applied to similar rods in other positions, the purpose being to provide a receptacle which may be supported upon and locked to the rod for the purpose of protecting various articles. To this end the invention includes a receptacle or case 12 having an open front 13 and having extending from its rear wall a lid or cover 14. The receptacle or case 12 may be constructed of any suitable material, such as leather or its substitute and is preferably finished and colored after the manner of the finish and coloring of the upholstery of the automobile. The cover 14 has secured upon its inner surface straps 15. These straps are arranged in spaced pairs and have one of their ends secured to the cover 14 and each pair of straps is provided with a buckle 16, whereby they may be fastened about the rod 11 after the cover 14 has been passed over the rod. The cover is adapted to be locked in closed position and for this purpose is provided preferably at each corner with a lock 17 so that when the cover is in locked position it will be impossible to remove the receptacle or case from the rod 11 and articles therein will be protected against theft or from the action of dust and rain.

The rear face and bottom of the case is preferably provided with a covering of felt, chamois or like soft material as indicated at 18 and 19 respectively, so as to protect the finish of the back of the seat 10.

While the invention is preferably constructed of leather or the like as stated, it is obvious that it may be made of metal and the cover 14 formed of a flexible material or hinged thereto so that it may enclose the rod 11.

The invention is susceptible of various changes in its form, proportions and minor details of construction and the right is herein reserved to make such changes as properly fall within the scope of the appended claim.

Having described the invention what is claimed is:—

A lap robe carrying receptacle adapted to be suspended from a lap robe bar and having substantially its entire front and its entire upper end open, the receptacle being of a length substantially the length of the bar, a closure flap carried by one end of the receptacle and adapted to extend around the bar and normally overlying the open front of the receptacle, cooperating fastenings between the front of the receptacle and the flap whereby to detachably connect the latter with the former, and a plurality of supporting elements connected with one of the side walls of the receptacle and the flap and adapted to embrace the bar.

In testimony whereof I affix my signature.

GEORGE B. SCHROYER.